G. A. LUNZ.
NONSKIDDING ATTACHMENT FOR VEHICLE WHEELS.
APPLICATION FILED NOV. 8, 1920.
1,410,200.
Patented Mar. 21, 1922.
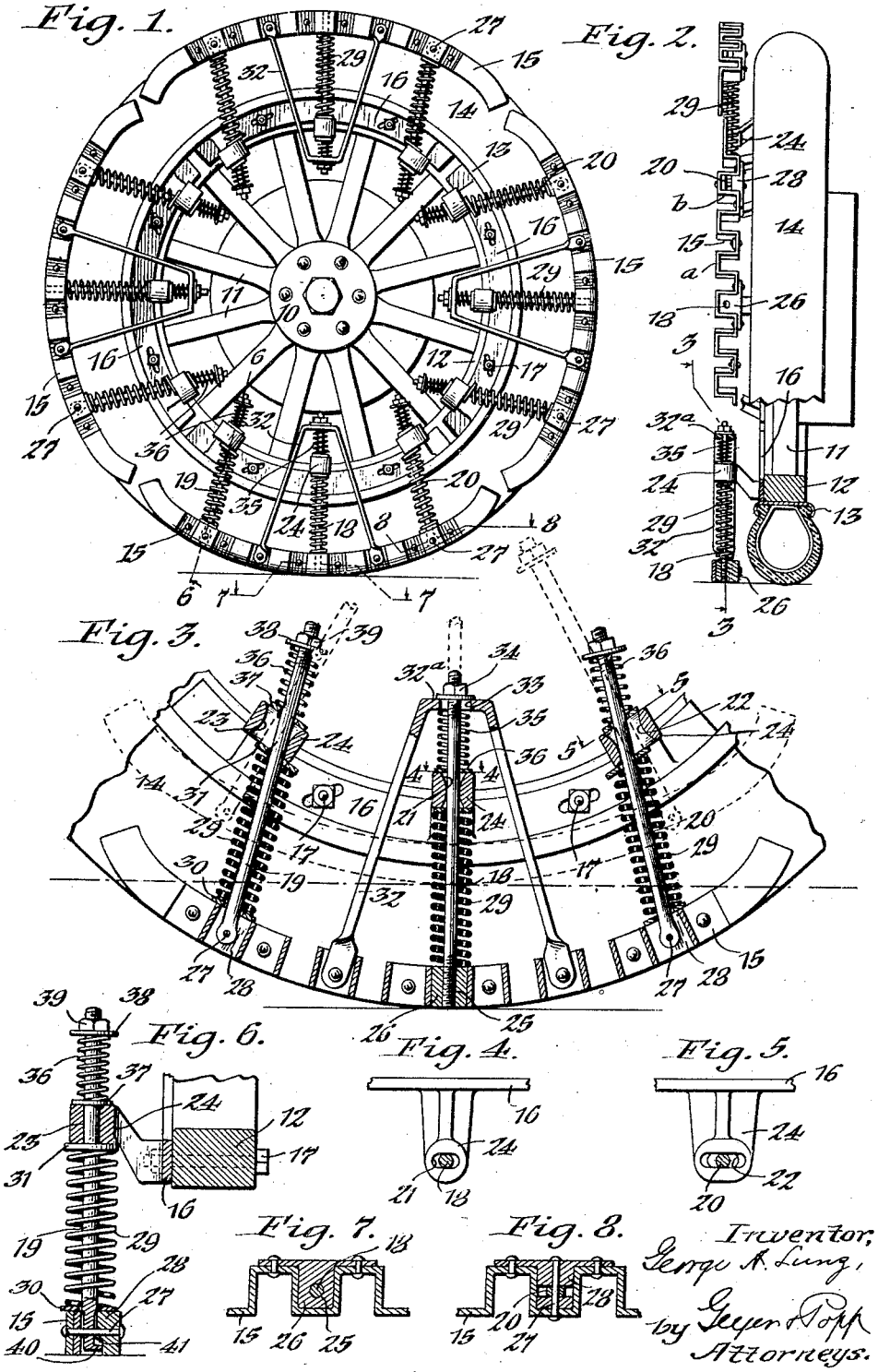

UNITED STATES PATENT OFFICE.

GEORGE A. LUNZ, OF BUFFALO, NEW YORK.

NONSKIDDING ATTACHMENT FOR VEHICLE WHEELS.

1,410,200.  Specification of Letters Patent.  Patented Mar. 21, 1922.

Application filed November 8, 1920. Serial No. 422,436.

*To all whom it may concern:*

Be it known that I, GEORGE A. LUNZ, a citizen of the United States, residing at Buffalo, in the county of Erie and State of New York, have invented new and useful Improvements in Nonskidding Attachments for Vehicle Wheels, of which the following is a specification.

This invention relates to a non-skidding attachment for vehicle wheels, the same being an improvement in devices of the type shown, for example, in Patent No. 1,320,401, granted to me November 4, 1919.

One of the objects of this invention is the provision of simple means for guarding against buckling or breakage of the tread sections and other parts under all conditions, and particularly in case the tire should become flattened in service.

Other objects are to increase the strength of the tread-sections and to provide the attachment with efficient shock-absorbing means.

In the accompanying drawings: Figure 1 is a side elevation of a vehicle wheel equipped with the improvement. Figure 2 is an end view thereof, partly in section. Figure 3 is an enlarged fragmentary vertical section on line 3—3, Fig. 2. Figures 4 and 5 are horizontal sections on the correspondingly numbered lines in Fig. 3. Figure 6 is a vertical section on line 6—6, Fig. 1. Figures 7 and 8 are horizontal sections on the correspondingly numbered lines in Fig. 1.

Similar characters of reference indicate corresponding parts throughout the several views.

This improvement is applicable to vehicle wheels generally, and for purposes of illustration has been shown in connection with an automobile wheel, wherein 10 indicates the hub, 11 the spokes, 12 the felly, and 13 the rim encircling the felly in the customary manner and carrying the pneumatic or other suitable tire 14.

The anti-skidding attachment is preferably arranged on the outer side of the wheel, and comprises a circular non-skidding tread or band 15 carried by a supporting member, ring or annular frame 16 removably secured to the felly by bolts 17 or other fastenings. This band is preferably composed of a plurality of independently-yielding segments or sections, four of such sections being shown in the drawings, each having a tread edge of zig-zag, sinuous or crenelate form, as shown, thus presenting non-skidding edges $a$ running lengthwise of the band, and traction edges $b$ extending crosswise of the band, which increase the traction of the wheel and prevent its slipping or spinning on slippery roadways. These tread-sections and their non-skid edges, may however be of any other suitable construction.

Mounted on each of the tread sections and extending inwardly therefrom are substantially radial rods 18, 19 and 20, the inner portions of which slide in corresponding bearing-openings or guides 21, 22 and 23, respectively, formed in lugs or brackets 24 projecting from the face of the corresponding ring 16. The intermediate or central rod 18 of each tread section is suitably fixed thereto, and as shown in Figs. 3 and 7, preferably by a screw-threaded connection 25 arranged in a filler block 26 riveted or otherwise secured to said tread section. The outer rods 19 and 20 of each tread section which are arranged on opposite sides of the central rod, are pivoted at their outer ends to the section by transverse pins 27 whereby said rods are capable of rocking or swinging in the plane of the wheel. As shown in Figs. 6 and 8, one end of each pivot pin 27 is supported in the adjacent outer portion of the tread section, while the other end thereof is supported in a filler block 28 suitably secured to said section. The inner ends of these rods pass through their respective bearing-openings 22, 23, which are preferably in the form of slots or openings elongated circumferentially of the supporting ring 16, so that these rods are capable of rocking freely on their pivots during the contracting and expanding movements of the tire and especially in the case of a flat tire.

Surrounding the rods 18, 19 and 20 are springs 29 preferably double-coiled springs, as shown, which are interposed between washers 30 and 31 seated against the opposing sides of the tread sections and brackets 24, respectively. The resistance of these springs is such as to press the tread sections against the road and yet allow them to yield to stones, ridges or other obstructions, the springs serving to absorb any of the road shocks.

A truss member 32 of substantially V-shaped form straddles the central rod 18 of each tread section, the arms of said member being secured to said tread section on either side of said rod, while the yoke 32a which connects the inner ends of said arms is arranged centrally of said rod and located on the inner side of the corresponding bearing bracket 24. Said central rod 18 projects inwardly beyond its bearing and passes through a circumferentially elongated opening 33 in said yoke, the rod being provided at its inner end with a nut 34 which bears against the opposing inner face of the yoke. Surrounding this rod is a shock absorbing spring 35 which is interposed between the yoke of the truss member and a washer 36 seated against the inner side of the bracket 24. The purpose of the truss members is to stiffen and reinforce the tread sections and relieve the pivots of the rods 19 and 20 from undue strains. These truss members are more particularly designed for use in connection with heavy trucks, but they may be eliminated on lighter vehicles, if desired.

The pivoted rods 19 and 20 of each tread section also project inwardly beyond their respective bearings, and surrounding them are shock absorbing springs 36 which are interposed between washers 37 and 38 seated against said bearings and retaining nuts 39, respectively. These springs, as well as the springs 35 of the truss members, are preferably lighter than the main springs 29.

Normally, adjacent tread sections are separated to the necessary extent to prevent their coming in contact with each other. However, should the tire become soft or even flat, the sections in contact with the road would contract and unless provision were made to prevent it, the opposing ends of adjacent sections would interfere with each other and cause buckling or breakage of the parts. To obviate such a condition, the opposing ends of the tread sections are offset relatively to each other as shown in Fig. 2, so as to clear each other. Notwithstanding this sectional construction, the tread band is practically continuous and does not interfere with the smooth riding of the vehicle.

The fixed rods 18 are so fitted in their bearing-openings 21, that they are permitted to rock to a limited extent in the plane of the wheel and avoid undue strain on them, particularly in starting the vehicles. For this purpose, the bearing-openings 21 may be flared toward both ends, as shown in Fig. 3, or otherwise enlarged or elongated circumferentially of the wheel.

The supporting ring 16 is preferably composed of sections corresponding to those of the tread, so that the attachment as a whole is made up of sections or units each consisting of a tread section, a ring or supporting section and a plurality of connecting rods and springs. While facilitating the application and removal of the several units composing the attachment, this construction also permits individual renewal of parts, when necessary, without requiring the renewal of the whole attachment.

As shown in Fig. 6, the inner face of each filler block 27, is preferably recessed to form a stop or shoulder 40, while the outer end of the corresponding pivot of each rod 19, or 20 is provided with an inwardly-facing lip or stop 41 adapted to engage said block-shoulder. The purpose of this construction is to prevent the pivot rod from being detached from its tread section should the corresponding pivot pin 27 become broken.

In practice, the tread band is of substantially the same external diameter as the tire, gripping the roadway and yielding with the tire under weight and vibrations of the vehicle. By pivotally mounting the rods 19 and 20 on the tread sections and providing a loose or rocking bearing for the same on the supporting-ring sections 16, these parts, while properly supporting and guiding the tread-sections, permit them to move toward and from the center of the wheel without binding or breakage of any of the parts, particularly in case the tire should become partially or wholly flat while in use.

I claim as my invention:

1. A non-skidding attachment for vehicle wheels, comprising a supporting member adapted to be attached to the side of a vehicle wheel, a non-skid tread band carried by said member and composed of radially movable sections, and slidable connections carried by said sections and guided on said supporting member, a conection of each of said sections being fixed to the section and the remaining connections being pivoted thereto.

2. A non-skidding attachment for vehicle wheels, comprising a supporting member adapted to be attached to the side of a vehicle wheel, and a non-skid tread band carried by said member and composed of radially movable sections, each of said sections having a fixed connection and a pivoted connection movable in the plane of the wheel, said connections being guided on said supporting member.

3. A non-skidding attachment for vehicle wheels, comprising a supporting member adapted to be attached to the side of a vehicle wheel, and a non-skid tread band carried by said member and composed of radially movable sections, each of said sections having a central rod fixed thereto and slidable on said supporting member and rods arranged on either side of said central rod and also slidable on said member, said last-named rods being pivoted to said section to rock in the plane of the wheel.

4. A non-skidding attachment for vehicle wheels, comprising a supporting member adapted to be attached to the side of a vehicle wheel, a non-skid tread band carried by said member and composed of radially movable sections, a radial rod fixed to each of said sections and slidable on said supporting members, a substantially radial rod pivoted to each of said sections and also slidable on said supporting member, said last-named rod being capable of rocking in the plane of the wheel, and yieldable means for resisting the inward movement of said sections.

5. A non-skidding attachment for vehicle wheels comprising a supporting ring adapted to be attached to the side of a vehicle wheel, said ring carrying a series of brackets having radially-disposed bearing-openings therein, a non-skid tread band composed of radially movable sections having guide rods slidable in said bearing-openings, resisting springs interposed between said brackets and said sections, and shock-absorbing springs applied to said guide rods and bearing against said brackets.

6. A non-skidding attachment for vehicle wheels comprising a supporting ring adapted to be attached to the side of a vehicle wheel, said ring carrying a series of radially disposed bearings, a non-skid tread band carried by said ring and composed of radially movable sections, a radial guide rod fixed to each of said sections and sliding in one of said bearings, a guide-rod pivoted to each of said sections and sliding in another of said bearings, said bearings being enlarged circumferentially of said ring to permit the rods to rock in the plane of the wheel, said rods extending inwardly beyond their bearings, springs interposed between said bearings and said sections for resisting the inward movement thereof, and shock absorbing springs applied to said rods on the inner sides of said bearings and abutting against the same.

7. A non-skidding attachment for vehicle wheels, comprising a supporting member adapted to be attached to the side of a vehicle wheel, a tread band carried by said member and composed of radially movable sections, radial connections carried by said sections and slidable on said supporting member, one connection of each of said sections being fixed to the section and the remaining connection being pivoted thereto, and truss members for each of said sections attached thereto on opposite sides of said fixed connection.

8. A non-skidding attachment for vehicle wheels, comprising a supporting member adapted to be attached to the side of a vehicle wheel, a non-skid tread band carried by said member and composed of radially-yieldable sections, each of said sections having a central rod fixed thereto and slidable on said supporting member, and rods pivoted to said section on either side of said central rod and also slidable on said member, and a substantially V-shaped truss member for each of said sections, the arms of said member being attached to said section on opposite sides of said fixed rod and the yoke of said truss engaging the inner end of said rod.

9. A non-skidding attachment for vehicle wheels, comprising a supporting member adapted to be attached to the side of a vehicle wheel and having a series of radial bearing brackets, a non-skid tread band carried by said member and composed of radially movable sections having stop-shoulders, guide rods pivoted to said sections to rock in the plane of the wheel, said rods being slidable in said bearing brackets and provided at their outer ends with lips adapted to engage said stop shoulders.

GEORGE A. LUNZ.